United States Patent [19]

Easter et al.

[11] Patent Number: 5,563,950
[45] Date of Patent: Oct. 8, 1996

[54] SYSTEM AND METHODS FOR DATA ENCRYPTION USING PUBLIC KEY CRYPTOGRAPHY

[75] Inventors: Randall J. Easter, Poughquaq; William A. Merz, Wappingers Falls, both of N.Y.

[73] Assignee: International Business Machines Corporation, Armonk, N.Y.

[21] Appl. No.: 453,137

[22] Filed: May 30, 1995

Related U.S. Application Data

[62] Division of Ser. No. 414,852, Mar. 31, 1995.

[51] Int. Cl.⁶ ........................................................ H04L 9/30
[52] U.S. Cl. ........................................................ 380/30
[58] Field of Search .......................................... 380/21, 30

[56] References Cited

U.S. PATENT DOCUMENTS

| | | | |
|---|---|---|---|
| 4,658,093 | 4/1987 | Hellman | 380/30 |
| 4,731,841 | 3/1988 | Rosen et al. | 380/30 |
| 5,144,665 | 9/1992 | Takaragi et al. | 380/30 |
| 5,295,188 | 3/1994 | Wilson et al. | 380/30 |
| 5,343,527 | 8/1994 | Moore | 380/30 |
| 5,368,468 | 1/1995 | Akiyama et al. | 380/30 |
| 5,412,721 | 3/1995 | Rager et al. | 380/21 |
| 5,414,772 | 5/1995 | Naccache et al. | 380/30 |

*Primary Examiner*—Salvatore Cangialosi
*Attorney, Agent, or Firm*—Lynn L. Augspurger, Esq.; Heslin & Rothenberg, P.C.

[57] ABSTRACT

An integrated circuit ("IC") chip is provided having both a public key cryptographic engine and a fuse array thereon. The fuse array is hardwired to the public key cryptographic engine and is encoded with a private key for use by the cryptographic engine. Specifically, prior to encapsulation of the IC chip, the fuse array is encoded using a laser ablation process. Upon encapsulation, the private key is permanently sealed and secured within the IC chip. The fuse array may also have a public key hash value and a serial number encoded therein.

12 Claims, 5 Drawing Sheets fig. 1
PRIOR ART fig. 2 fig. 3 fig. 4 fig. 5 fig. 6

SYSTEM AND METHODS FOR DATA ENCRYPTION USING PUBLIC KEY CRYPTOGRAPHY

This application is a division of Ser. No. 08/414,852 filed Mar. 31, 1995 now pending.

TECHNICAL FIELD

The present invention is generally related to data encryption. More specifically, the present invention relates to a system and methods for encrypting data using public key cryptography.

BACKGROUND OF THE INVENTION

As computers become more deeply ingrained in the operations of everyday life, the need for securing information processed thereby becomes increasingly important. This need for secrecy applies to many types of information including corporate, governmental and personal information. Encryption of such information is accordingly useful; however, even encryption systems are not entirely secure. Thus, any techniques for improving the integrity of encryption systems are desirable.

A common data encryption technique is the Data Encryption Standard ("DES") which has been adopted by the National Bureau of Standards of the United States government. Although DES provides relatively secure and inexpensive cryptographic processing of data, certain management aspects of DES-based equipment suffer from problems. Specifically, techniques for managing encryption keys for DES-based encryption equipment are problematic.

The DES encryption method is based upon a secret master key. When this master key is used by two parties, they may successfully encrypt and decrypt each other's information. However, problems arise in connection with distributing a new master key to communicating parties. One prior distribution method comprised giving a new master key to an entrusted person who manually entered the new master key into each cryptographic device. Unfortunately, if either the cryptographic devices are remotely situated or if there are many cryptographic devices, then manually entering master keys into each is very cumbersome and time consuming. Further, there are risks associated with disclosure of the master keys to personnel. Another method of distributing keys comprises transmission thereof via insecure communications links directly to the cryptographic devices. Such unsecured key distribution is obviously unacceptable.

An alternate data encryption technique comprises public key cryptography. According to this technique, users can exchange encrypted information without initially exchanging a common secret master key. Specifically, each user has both an individual public key ("$K_p$") and an individual private (i.e. secret) key ("$K_s$"). The public key is obtainable from a common database of every user and their respective public key (the database is typically maintained on a central computing system that is designated a "key manager"). Private keys are conventionally entered into the local system by the user through manual entry or insertion of a removable data card with the private key stored thereon.

During operation of a public key cryptography system, a sending user will first select a receiving user that a message will be sent to. The sending user then looks up the receiving user's public key by remotely accessing the key manager, encrypts the message using the selected user's public key and sends the message. The receiving user may then use his secret private key to decrypt the message. It should be noted that public key cryptography techniques use "one-way" functions such that a sending user cannot use a receiving user's public key to decipher the corresponding private key. Public key systems are old and well known in the art, for example, as described in "A Method for Obtaining Digital Signatures and Public Key Cryptography," by Rivest et al., Comm. ACM, Vol. 21, No. 2 (February 1978), hereby incorporated by reference herein in its entirety. Specifically, a Rivest, Shamir and Adelman ("RSA") public key encryption system is described therein.

Public key cryptography systems are typically slower than DES systems such that they are not usable in many data processing applications. As a solution, it has been suggested that a public key system be used on a short-term basis to distribute keys for a more conventional DES-type system that is used in long-term data processing (see Rivest et al. incorporated by reference hereinabove). However, problems remain in the area of key management for public key systems.

Specifically, as discussed above, a private key is desirably maintained securely for each user. However, this introduces the same security problems as discussed above with respect to DES, namely, how to secure the private key. As one solution, plug in cards containing read only memories ("ROMs") with the private key stored thereon have been suggested, however these may be decoded, lost or stolen. Again, unsecured transmission of private keys is equally unacceptable. Thus, a more secure technique for establishing private keys is desirable.

The present invention is directed toward solutions for the above noted problems.

DISCLOSURE OF THE INVENTION

In a first aspect, the present invention comprises an integrated circuit ("IC") chip for use in a cryptographic system. The IC chip comprises a non-volatile memory which contains a private key. The IC chip also includes a public key cryptographic engine coupled to the non-volatile memory. In particular, the public key cryptographic engine uses the public key during operations.

As an enhancement, the non-volatile memory may comprise a fuse array. More specifically, the private key may be encoded into the fuse array during fabrication of the IC chip. The fuse array may also be encoded with, for example, a public key hash value and a serial number.

In another aspect, the present invention includes a method for establishing a private key in a cryptographic system. The method includes providing the IC chip with the public key encryption engine and the non-volatile memory described above. Further, the private key is encoded into the non-volatile memory of the IC chip. In the case where the non-volatile memory comprises a fuse array, the encoding may be performed by laser ablation. Further methods and systems are disclosed herein.

To summarize, the techniques of the present invention facilitate a public key cryptographic system with many advantages and features. The non-volatile factory encoding of the private key into the IC chip prior to encapsulation ensures the secrecy of the private key. Specifically, any attempt to discover the private key will result in the destruction of the IC chip. Further, the use of non-volatile memory for the private key removes security problems associated with loading an IC chip with a value through external means. Thus, a highly secure single IC chip public key cryptographic system is provided having many uses including, for example, the secure transfer and loading of keys for other cryptographic systems such as DES.

BRIEF DESCRIPTION OF THE DRAWINGS

The subject matter that is regarded as the present invention is particularly pointed out and distinctly claimed in the concluding portion of the specification. The invention however, both as to organization and method of practice, together with further objects and advantages thereof, may best be understood by reference to the following detailed description taken in conjunction with the accompanying drawings in which the same or similar reference numbers are used to identify the same or similar elements and in which:

BEST MODE FOR CARRYING OUT THE INVENTION

The techniques of the present invention facilitate the creation and operation of a high-security, high-performance public key cryptography system. Specifically, this cryptography system is contained on a single IC chip along with a non-volatile memory which contains a factory encoded private key. Thus, once factory-encoded and encapsulated, there is no way to discover the private key absent destruction of the IC chip. Therefore, this single IC chip cryptographic system ("single chip system") achieves the highest level of security certification pursuant to the "SECURITY REQUIREMENTS FOR CRYPTOGRAPHIC MODULES" standard published by the U.S. Department of Commerce as FIPS PUB 140-1, Jan. 11, 1994 and hereby incorporated by reference herein in its entirety.

It should be further noted that the non-volatile key storage area on the single chip system facilitates other features. For example, a value corresponding to the public key (which corresponds to the factory-programmed private key) may be factory-encoded into the non-volatile memory in addition to the private key. Also, a programmable storage area on the single chip system may be designated for storing the public key. During operational initialization of the single chip system, the public key being loaded may be verified against the factory-encoded value corresponding to the public key to ensure that the proper public key is used.

The techniques of the present invention may be used in conjunction with previous cryptographic systems. For example, they may be used to provide a public key cryptography system that facilitates secure transmission and loading of keys for a traditional encryption engine (e.g., a DES encryption engine).

Figure 1:
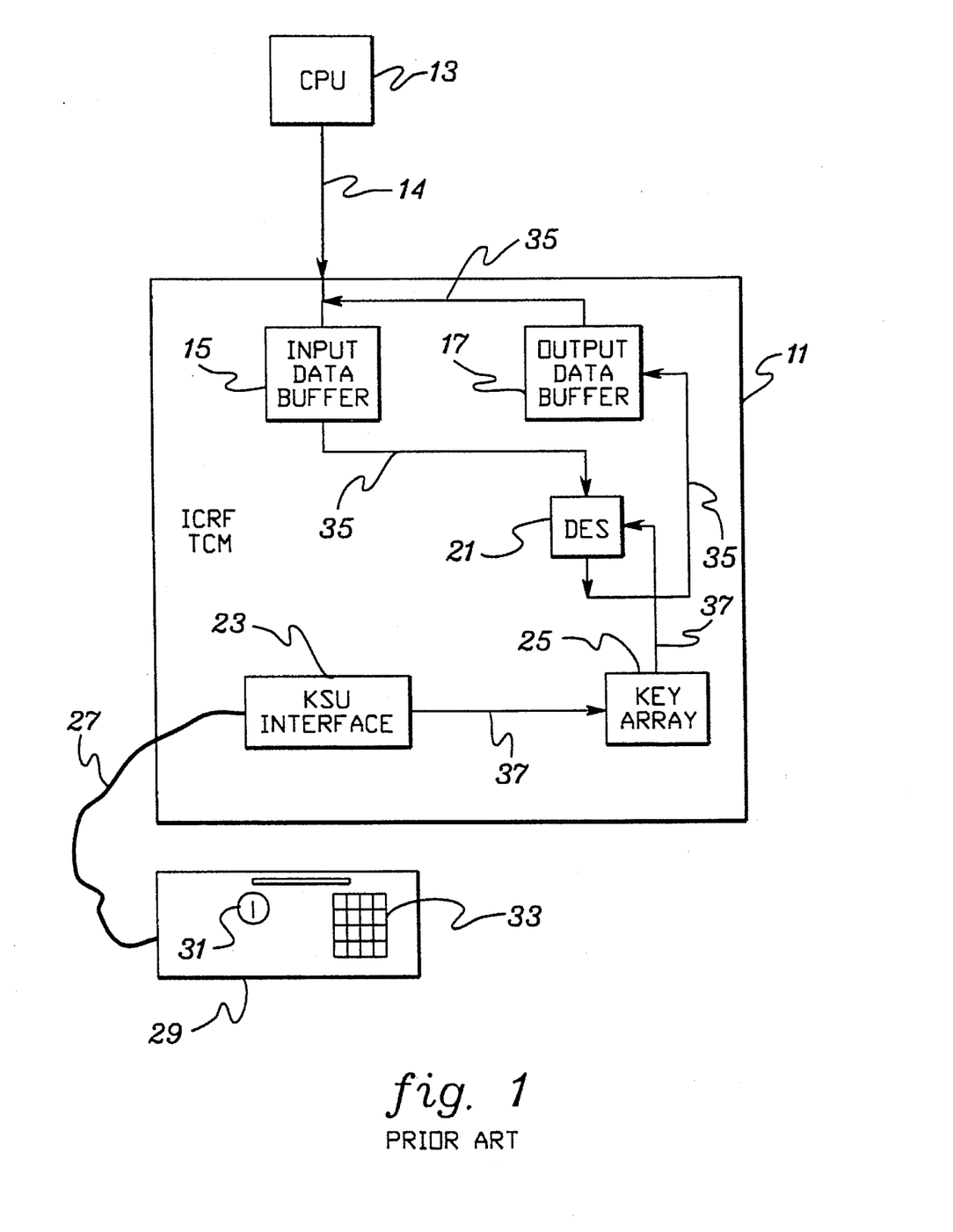
FIG. 1 is a system diagram of a conventional cryptography system employing manual key entry.

By way of general background, a conventional manually key loaded DES encryption system is shown in FIG. 1. An Integrated Cryptographic Resource Facility ("ICRF") Thermal Conduction Module ("TCM") 11 is shown coupled to a Central Processing Unit ("CPU") 13 and a Key Storage Unit ("KSU") 29. CPU 13 may comprise, for example, an IBM ES/9000 architecture processing unit of which connection of ICRF TCM 11 through a bus 14 is a well-known feature. Further, KSU 29 is also a well-known feature and is connected to ICRF TCM 11 through a secure cable 27. These entities are protected by physically secure hardware that provides tamper detection and subsequent response.

The KSU 29 provides a memory for the storage of master keys. Specifically, the keys are entered by placing the KSU in a mode ready to accept a master key part. The user, in conjunction with the insertion of a brass key 31, then enters the master key parts manually using a hexadecimal key pad 33.

The ICRF TCM 11 contains multiple IC chips which together implement the functional elements necessary for a DES based encryption engine. Specifically, an input buffer 15 and an output buffer 17 coordinate data input/output to CPU 13 over the internal busses 5 and CPU bus connection 14. A cryptography engine, namely a DES engine 21 is provided within the data paths of busses 35 to facilitate cryptographic encoding and decoding of data. Lastly, key management is provided by a combination of a KSU interface 23, a volatile key array 25 for the storage of DES master keys, and key transfer busses 37.

The manual key entry feature of this system has several shortcomings. In particular, physical access to KSU 29 can be difficult. Specifically, computer systems are often remote, making physical access to them inconvenient. Further, if there are multiple systems, greater personnel resources are required for key management servicing. Moreover, the need to disclose DES master key parts to personnel decreases the overall security of the system. Thus, a more secure and easier to manage key distribution system is required.

Figure 2:
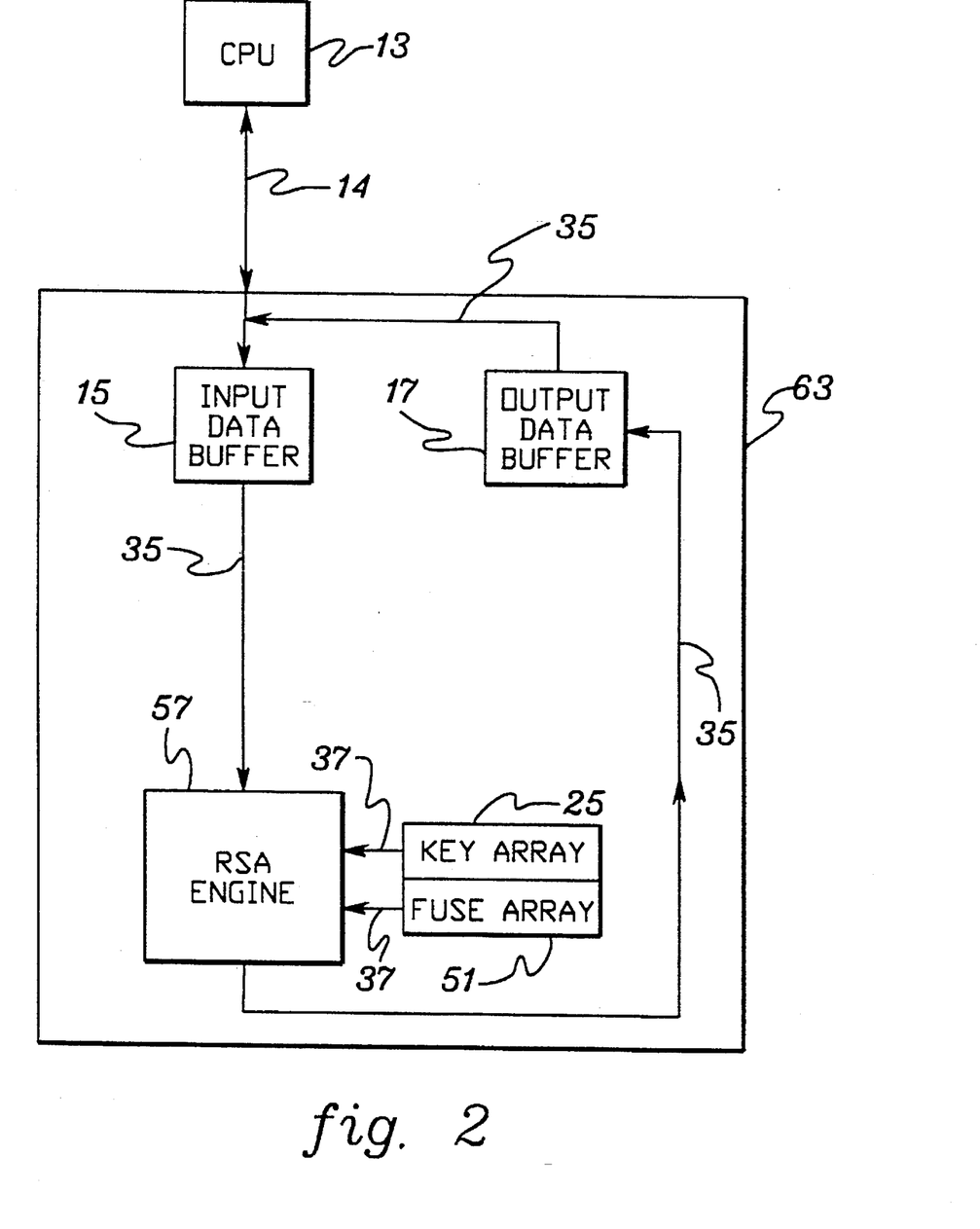
FIG. 2 is a system diagram of a single integrated circuit ("IC") chip public key cryptography system according to an embodiment of the present invention.

One solution to the aforementioned problems involves the use of a public key cryptography system to facilitate key distribution for a DES system. In that regard, in one embodiment of the present invention, a single IC chip public key cryptography system 63 may be provided (FIG. 2). To note, the same reference numbers are used in FIG. 2 to denote similar functional elements from FIG. 1.

Single IC chip 63 includes input buffer 15 and output buffer 17 that control I/O with CPU 13 over internal busses 35 and I/O bus 14. An RSA engine 57 is provided as a public key cryptography engine. All of these elements are interconnected by bussing 35. Further, key storage is provided by a combination of a fuse array 51 and a key array 25 that are connected to RSA engine 57 via key transfer busses 37.

Key storage facilities for RSA engine 57 are provided by a combination of key array 25 and fuse array 51. To recall, public key cryptographic engines (such as RSA engine 57) require the use of a private key and a public key. In accordance with the present invention, the private key is contained within a non-volatile memory comprising fuse array 51, while the public key is loadable into a volatile memory (such as a random access memory, a "RAM") comprising key array 25.

To further explain, secure storage of the private key for a public key system has long been a difficult task. Many techniques have been tried, but none have achieved a very high level of security. For example, in U.S. Pat. No. 4,723, 284, entitled "AUTHENTICATION SYSTEM," by Munck et al., issued Feb. 2, 1988 and hereby incorporated by reference herein in its entirety, the private keys are contained on removable ROM cards. These may be stolen, lost or decoded. According to the techniques of the present invention, the private key for a given system is factory encoded into fuse array 51 of single IC chip 63 before encapsulation. Thus, after the IC chip is encapsulated, only destruction of the IC chip itself would enable detection of the private key.

The individual processing steps needed to fabricate such an IC chip will be apparent to one of ordinary skill in the art. Specifically, many commercial single chip RSA systems having volatile public and private key storage are available. One example is the RSA chip from Jydks Telefon of Denmark of which the advertising brochure entitled "You Can Now Obtain the Rights to a Brand New World Record" is incorporated by reference herein in its entirety. However, these chips suffer from the aforementioned security problems of having to load private keys from external sources during operation. Pursuant to the techniques of the present invention, fuse array 51 is incorporated into the IC chip during fabrication in place of a conventional volatile key storage means.

Fuse arrays are well known available parts of IC chip fabrication processes such as a Complementary Metal Oxide Semiconductor ("CMOS") process as will be apparent to one of ordinary skill in the art (see, for example, "Restructurable VLSI Using Laser Cutting and Linking," by J. I. Raffel of the Massachusetts Institute of Technology Lincoln Laboratory, SPIE/LA 1983). In accordance with the principles of the present invention, fuse array 51 is used for storing, for example, the private key, a serial number and a hash value for the corresponding public key.

Figure 3:
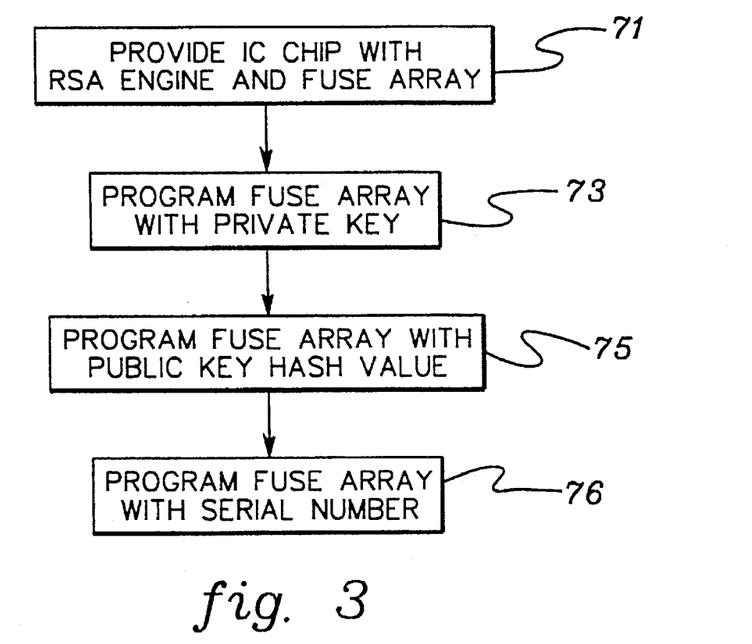
FIG. 3 is a flow diagram of a method for encoding key information into the single IC chip cryptography system of FIG. 2 in conformance with one embodiment of the present invention.

The process for encoding IC chip 63 is summarized in the flow diagram of FIG. 3. Specifically, IC chip 63 is provided having the RSA engine 57 and coupled fuse array 51 (step 71). This IC chip may be fabricated in-house, or may be provided by an external supplier. To continue, a private key/public key pair is designated for the IC chip. Pursuant to the present invention, fuse array 51 is encoded with the private key (step 73). Further, the fuse array is encoded with the hash value for the corresponding public key (step 75) and a serial number (step 76). The encoding step is described in further detail below.

More specifically, a hash function is applied to the public key to determine the corresponding public key hash value. One example of a hash function is a Modification Detection Code 4 ("MDC4") function. A technique for performing an MDC4 function is contained within "The MD4 Message-Digest Algorithm" by Rivest, Network Working Group RFC 1320 of the MIT Laboratory for Computer Science and RSA Data Security, April 1992, hereby incorporated by reference herein in its entirety. Accordingly, the MDC4 function is applied to the public key to determine a corresponding hash value which is encoded into the fuse array. It should be noted, that other classes of functions may be substituted for hash functions. Essentially, any function that accepts the public key as input and produces a value representative thereof as an output would qualify. Hash functions are only one example of such a function.

Further, a serial number corresponding to the public/private key pair is encoded into fuse array 51. The serial number is a public value that is used to, for example, look up a corresponding public key in a key manager. For example, a public key for a system may be obtained by querying the system for its serial number, and then presenting the serial number to a key manager in order to obtain the corresponding public key.

The individual process for encoding the fuse array will be apparent to one of ordinary skill in the art. Specifically, as one example, a laser ablation process may be used to selectively break designated fusible links of the fuse array (see again, for example, the Raffel article incorporated hereinabove). As one example, a broken link may represent a binary zero and an intact link may represent a binary one. Thus, the public key hash value, private key and serial number may be accordingly encoded.

After encoding, IC chip 63 is encapsulated and readied for incorporation into circuitry. At this stage, any record of the private key may be disposed of such that the private key value is absolutely secure. In fact, any attempt to dismantle the encapsulated IC chip to discover the configuration of the fuse array would most likely destroy the IC chip. In accordance therewith, this IC chip obtains the highest level of security ranking according to the FIPS 140-1 standard discussed hereinabove.

As mentioned previously, a public key hash value is encoded into the fuse array such that the verification of a public key for loading into the key array is facilitated. To further explain, during operational initialization of IC chip 63, it is desirable to load the public key into key array 25 (FIG. 2). However, it is also desirable to verify that the public key is correct before doing so. By calculating, for example, a hash value for the proposed public key and comparing it to the predetermined factory encoded public key hash value, verification of the proposed public key is facilitated.

Figure 4:
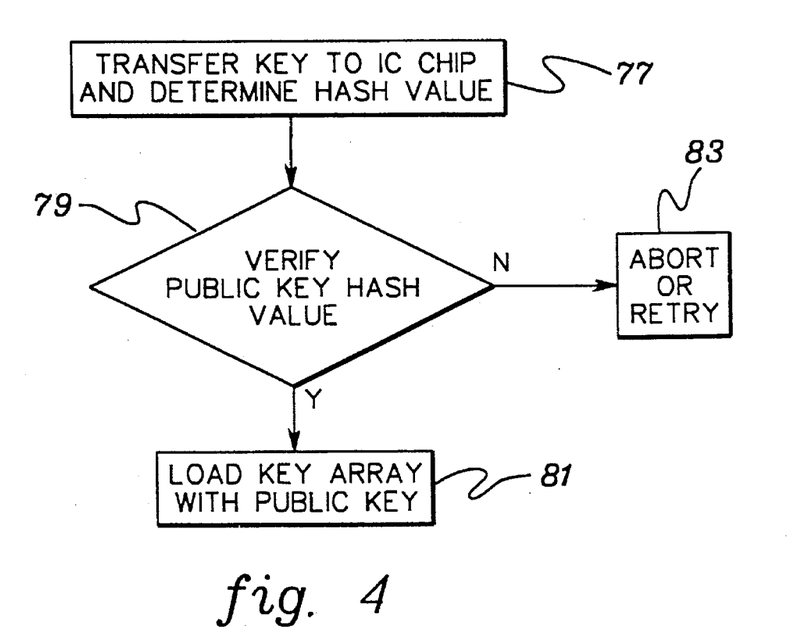
FIG. 4 is a flow diagram of a method for loading a public key into the single IC chip cryptography system of FIG. 2 pursuant to an embodiment of the present invention.
Figure 6:
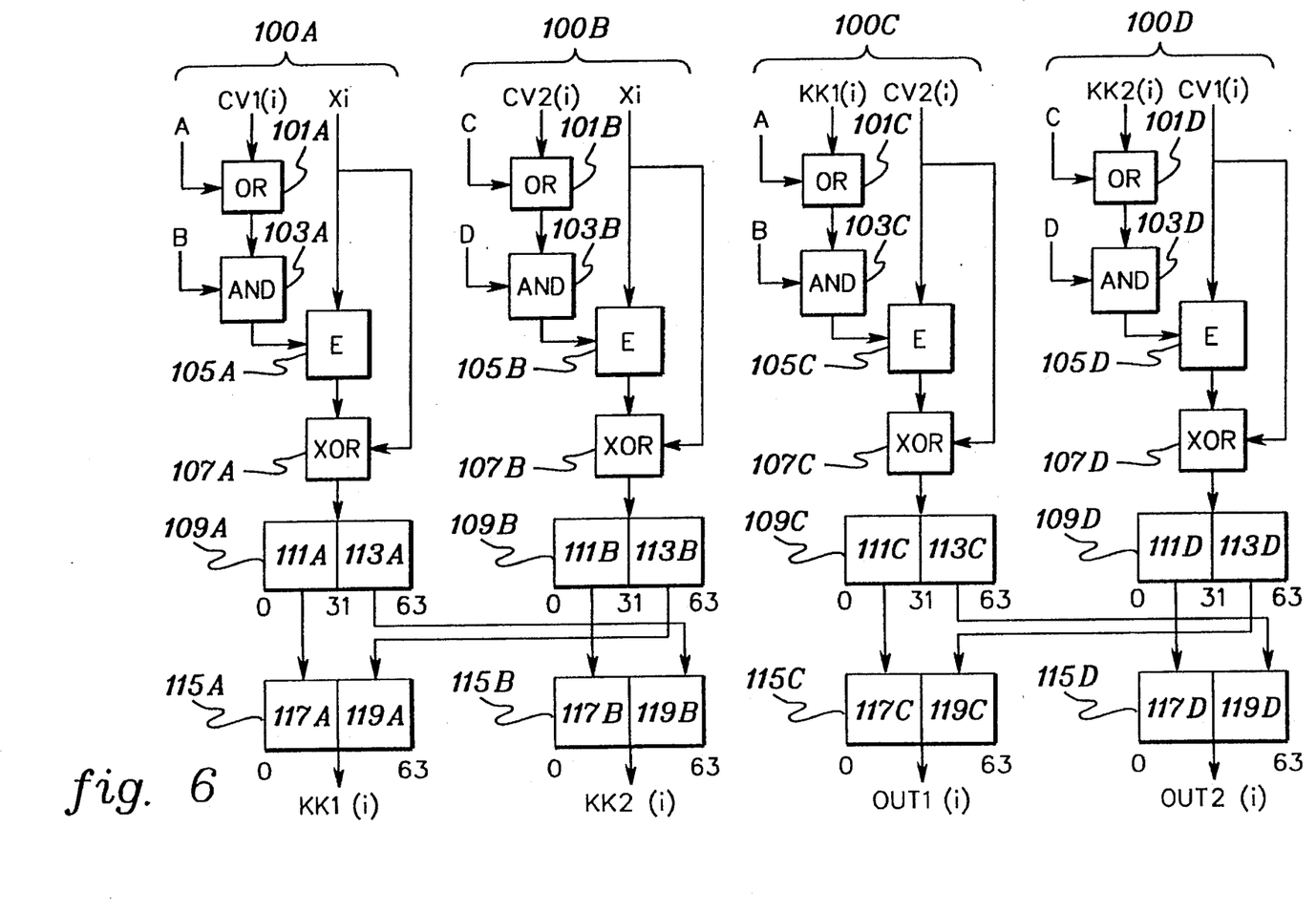
FIG. 6 is a system diagram of a hardware implementation of a Modification Detection Code 4 ("MDC4") function pursuant to an embodiment of the present invention.

The public key verification process is summarized below with respect to the flow diagram of FIG. 4. First, a proposed public key is obtained for loading into key storage array 25 of the single IC chip 63 (FIG. 2). This key may be, for example, retrieved from a key manager. The proposed public key is then transferred to the IC chip 63 wherein a hash value is calculated therefor (step 77). Specifically, a hardware implementation of a hashing algorithm, for example, an MDC4 algorithm on the IC chip is used to perform the calculation. Implementing, for example, an MDC4 algorithm in hardware will be apparent to one of ordinary skill in the art in view of the Rivest MDC4 algorithm incorporated by reference hereinabove and in view of the example circuit described below (FIG. 6). The determined hash value for the proposed public key is then compared to the hash value stored in the fuse array (step 79). If a positive comparison results, then key array 25 is loaded with the verified proposed public key (step 81). If the comparison is negative, then the operation may be re-tried or aborted (step 83) and appropriate system level indication given.

A hardware implementation of a MDC4 function is shown in the system diagram of FIG. 6. Specifically, one stage of a multi-stage system is shown. In total, the multiple stages calculate a single MDC for n 64 bit blocks of data (n>=1). This particular stage accepts a 64 bit block of data designated Xi (1<=i<=n). Also accepted as input is CV1(i) and CV2(i) which correspond to outputs of a previous stage, namely OUT1(i−1) and OUT2(i−1) respectively. The MDC4 system shown also passes intermediate values between sections thereof as KK1(i) and KK2(i). In particular, a section 100A outputs KK1(i) which serves as input to a section 100C, while a section 100B outputs KK2(i) which serves as input to a section 100D.

Section 100A of the MDC4 hardware system is described in detail below. The other sections function similarly and are designated with corresponding reference numerals. In section 100A, input CV(i) and 'A' are ORed in an OR element 101A. The value of 'A' is, for example, hexadecimal 4000000000000000 for an MDC4 function. The output of OR element 101A is input to an AND element 103A for logical ANDing with 'B'. The value of 'B' is, for example, hexadecimal DFFFFFFFFFFFFFFF for an MDC4 function. The output of AND element 103A is input to an E element 105A (an adder) for adding with the value of Xi. The output of E element 105A is input to an XOR element 107A for exclusive ORing with the value of Xi. The result from XOR element 107A is passed to a register 109A which includes a left-half 111A (bits 0 to 31) and a right-half 113A (bits 32–63). Register 109A is combined with the value of a register 109B from section 100B as discussed hereinbelow.

Section 100B has a similar structure to section 100A. As one difference, CV2(i) is employed as an input in place of CV1(i) of section 100A. A further difference includes the substitution of values 'C' and 'D' for the 'A' and 'B' values respectively. Specifically, for example, 'C' may comprise hexadecimal 2000000000000000 and 'D' may comprise hexadecimal BFFFFFFFFFFFFFFF for an MDC 4 function. With these exceptions noted, an OR element 101B, an AND element 103B, an E element 105B, an XOR element 107B and a register 109B having a left-half 111B and a right-half 113B function similarly to their respective elements in section 100A.

Registers 109A and 109B are cross-coupled such that a combination of their values are stored in a register 115A and a register 115B for output to sections 100C and 100D as the KK1(i) and KK2(i) values, respectively. Specifically, right-half 113A of register 109A is coupled to a right-half 119B of register 115B, while right-half 113B of register 109B is coupled to a right-half 119A of register 115A. The left-half 111A of register 109A is coupled to a left-half 117A of register 115A, and left-half 111B of register 109B is coupled to a left-half 117B of register 115B. In sum, the values of KK1(i) and KK2(i) are stored in registers 115A and 115B, respectively.

The remainder of the MDC4 system, namely sections 100C and 100D, is similar to sections 100A and 100B, respectively, as discussed above. As one difference, the inputs have changed. Specifically, in section 100C, KK1(i) and CV2(i) are substituted for CV1(i) and Xi of section 100A, respectively. Similarly, in section 100D, KK2(i) and CV1(i) are substituted for CV2(i) and Xi of section 100B, respectively. A further difference comprises the outputs. In particular, in section 100C the output comprises OUT1(i), and in section 100D the output comprises OUT2(i). Absent the above noted differences, similarly numbered elements have similar functions with respect to the elements of sections 100A and 100B as compared to the elements of sections 100C and 100D, respectively.

The single stage of the MDC4 system described hereinabove is replicatable to achieve all stages necessary for processing as will be apparent to one of ordinary skill in the art. Thus, a hardware based MDC4 function is implemented. Other functions for calculating a hash value, or similar type value based on the public key are also implementable in hardware on a single IC chip. The details of such implementation will be apparent to one of ordinary skill in the art.

Figure 5:
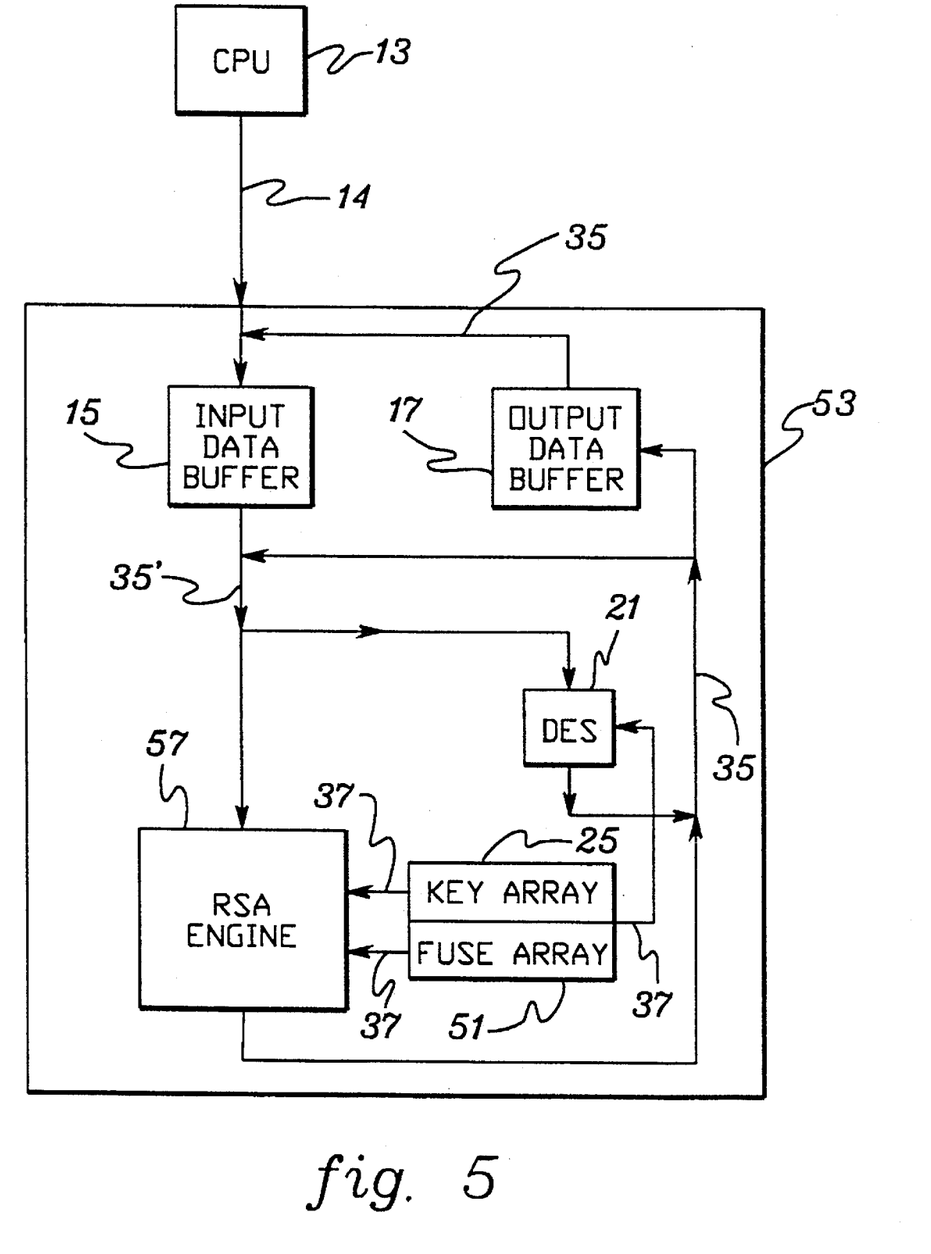
FIG. 5 is a system diagram of a cryptography system that uses public key cryptography to facilitate master key transfer for a DES cryptographic engine according to one embodiment of the present invention.

As a further application example of the techniques of the present invention, a DES-based encryption system that uses the public key cryptography techniques of the present invention to simplify DES master key distribution may be created (FIG. 5). The system depicted in FIG. 5 is similar to that of FIG. 1, however all aspects of manual key loading have been replaced by a public key cryptography system. Further, all of this functionality has been implemented on a single IC chip 53 in accordance with the present invention.

Single IC chip 53 includes many similar elements as the systems of FIGS. 1 and 2, namely input buffer 15 and output buffer 17 that control I/O with CPU 13 over internal busses 35 and I/O bus 14. Further, a DES encryption engine 21 is implemented on the single IC chip 53 to provide cryptographic functionality. In addition, RSA engine 57 is provided as a public key cryptography engine. Key storage for the various encryption engines is provided by a combination of fuse array 51 and key array 25. Data paths between elements are provided by internal bussing 35, while key transfers occur over key transfer busses 37.

Keys for DES encryption engine 21 are stored in key array 25. This is a programmable storage area comprising, for example, RAM. Operationally, keys are transferred for use as DES master keys via public key cryptography techniques using RSA engine 57. One technique for such transfer is described in Munck et al., incorporated by reference hereinabove. Advantageously, using the techniques of the present invention, the private key is secured and the disadvantages of prior manual key loading systems are overcome.

To summarize, the techniques of the present invention facilitate a public key cryptographic system with many advantages and features. The permanent factory encoding of the private key into the IC chip prior to encapsulation ensures the secrecy of the private key. Again, any attempt to discover the private key will result in the destruction of the IC chip. The use of an encapsulated fuse array enhances this feature. Further, the use of non-volatile on-chip storage for the private key removes security problems associated with loading a chip with a private key value through external means. Thus, a highly secure single IC chip public key cryptographic system is provided having many uses including, for example, the secure transfer and loading of keys for other cryptographic systems such as DES.

While the invention has been described in detail herein, in accordance with certain preferred embodiments thereof, many modifications and changes therein may be affected by those skilled in the art. Accordingly, it is intended by the appended claims to cover all such modifications and changes as fall within the true spirit and scope of the invention.

What is claimed is:

1. A method for establishing private keys in a cryptographic system comprising the steps of:
    (a) providing an integrated circuit ("IC") chip having a public key encryption engine and a non-volatile memory, said public key encryption engine being coupled to said non-volatile memory; and
    (b) encoding a private key into said non-volatile memory of said IC chip.

2. The method of claim 1, wherein said non-volatile memory comprises a fuse array and wherein said encoding step (b) comprises encoding said private key into said fuse array.

3. The method of claim 2, wherein said encoding step (b) is performed by laser ablation.

4. The method of claim 1, wherein said encoding step (b) further includes encoding a value representative of a public key into said non-volatile memory.

5. The method of claim 4, wherein said value representative of said public key comprises a public key hash value such that said encoding step (b) includes encoding said public key hash value into said non-volatile memory.

6. The method of claim 5, including using said public key hash value is used to verify said public key.

7. The method of claim 1, wherein said encoding step (b) further includes encoding a serial number into said non-volatile memory.

8. The method of claim 1, wherein said providing step (a) comprises providing said IC chip as unencapsulated, and wherein said method further includes encapsulating said IC chip after said encoding step (b).

9. A method for facilitating loading of a proposed public key into an integrated circuit ("IC") chip having a public key encryption engine, said method comprising the steps of:

(a) providing an IC chip having said public key encryption engine and a non-volatile memory, said public key encryption engine being coupled to said non-volatile memory, said non-volatile memory having a value representative of a predetermined public key contained therein; and (b) verifying said proposed public key against said value representative of said predetermined public key such that said loading of said proposed public key is facilitated.

10. The method of claim 9, wherein said value representative of said predetermined public key comprises a public key hash value such that said providing step (a) includes providing said IC chip having said public key hash value contained therein and said verifying step (b) comprises verifying said proposed public key against said public key hash value.

11. The method of claim 1, wherein the cryptographic system is adapted to perform RSA-type operations in association with said private key.

12. The method of claim 5, wherein said encoding step (b) further includes encoding a serial number into said non-volatile memory, the serial number corresponding to the public and private keys, and wherein the cryptographic system is adapted to perform RSA-type operations in association with said private key.

* * * * *